Dec. 2, 1969             J. C. BARR             3,481,424
SURFACE EFFECT MACHINE SKIRT STRUCTURE
Filed March 11, 1968
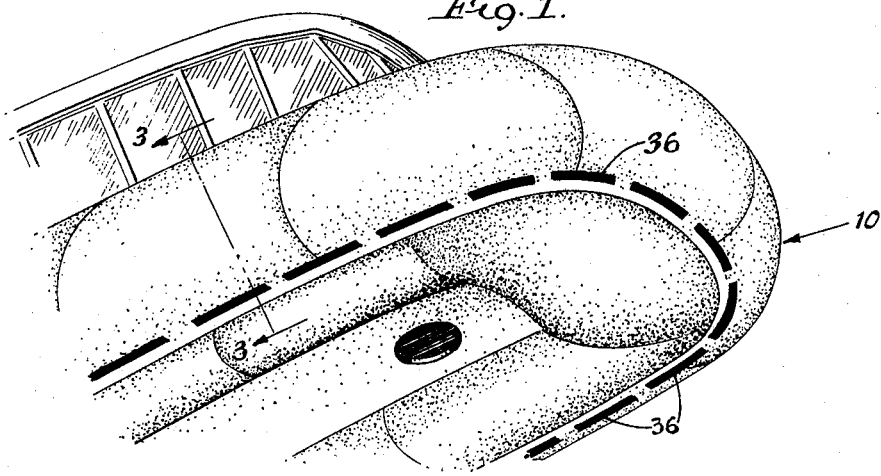
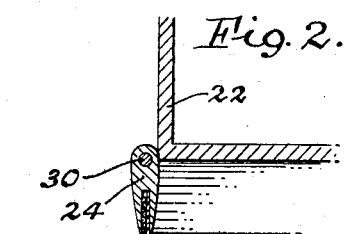
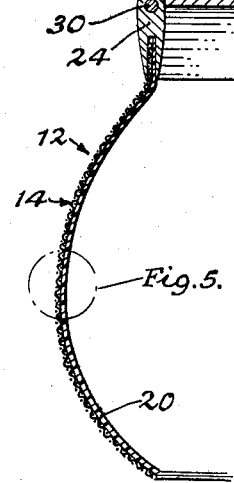
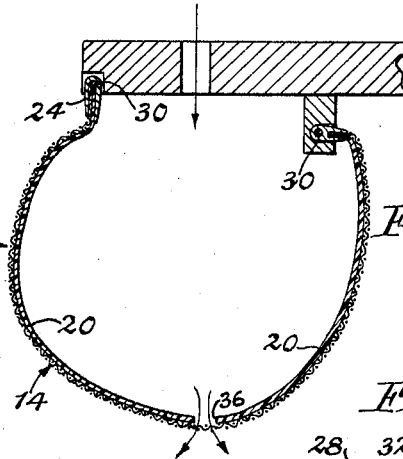
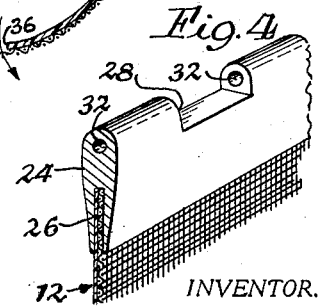
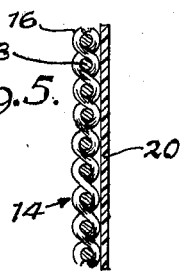
INVENTOR.
JEFFREY C. BARR
BY
Bean + Bean
ATTORNEYS

United States Patent Office 3,481,424
Patented Dec. 2, 1969

3,481,424
SURFACE EFFECT MACHINE SKIRT STRUCTURE
Jeffrey C. Barr, North Tonawanda, N.Y., assignor to Bell Aerospace Corporation, Wheatfield, N.Y.
Filed Mar. 11, 1968, Ser. No. 712,259
Int. Cl. B60v 1/00, 1/16
U.S. Cl. 180—124                                         4 Claims

ABSTRACT OF THE DISCLOSURE

An improved form of air cushion confining flexible skirt structure for ground effect machines or the like; comprising a composite sheet-like fabrication including a preshaped light-weight, net-like lamination formed of strong tensile members, and a second lamination comprising a lightweight, relatively fragile but air-imprevious film-like member. The combination fabrication embodies the structural integrity of the mesh-like lamination and the air-tight characteristics of the film-like lamination, and therefore combines in an extremely light-weight construction optimum air-tightness and structural form integrity. The structure is inexpensive to manufacture and readily repairable in the field by relatively inexpert personnel, and is adaptable to provide a ground effect vehicle skirt construction embodying novel air exit layer control and ground travel lubrication capabilities.

Background and prior art

Flexible skirts and/or air-inflated trunks for ground effect vehicles and the like have heretofore been typically constructed of rubber coated fabrics; the fabrics being of multi-layer woven cloth form impregnated and coated with synthetic or natural rubber or the like to render the material air-tight yet flexible. Such fabrications are necessarily thick and heavy, with a view to provide them with practical obstacle impact and tear and abrasion resistance; and therefore such fabrications are much heavier than would be required to simply retain the vehicle support cushion air.

The invention

The present invention provides a novel fabrication which avoids the objections and disadvantages of the prior art as set forth hereinabove; and by way of example, the invention is described in the following specification and illustrated by the accompanying drawing, wherein:

FIG. 1 is a fragmentary underneath perspective view of a ground effect machine or the like, equipped with an inflated trunk air cushion confining undercarriage such as may be advantageously constructed of a fabrication of the present invention;

FIG. 2 is a fragmentary vertical sectional view of a typical ground effect type machine hull having depending therefrom a flexible skirt system, such as wherein the skirt portion thereof is provided by means of a fabrication of the invention;

FIG. 3 is a fragmentary sectional view on enlarged scale, taken as suggested by line 3—3 of FIG. 1;

FIG. 4 is a fragmentary enlarged scale perspective view of a skirt attachment detail of the construction shown in FIG. 2; and FIG. 5 is an enlarged scale sectional view of a typical portion of the fabrication such as indicated at 5 (FIG. 2).

As shown in the drawing herewith, the fabrication of the invention is applicable for example, in connection with the construction of an inflatable "trunk" type air cushion enclosure system as indicated generally at 10 (FIGS. 1, 3) and of a simple flexible skirt type construction as indicated generally at 12 (FIG. 2). Thus, the term "skirt" and "skirt fabric" as used hereinafter will be understood to refer to the sheet-like material which may be used to construct either type air-cushion enclosure.

As perhaps is best illustrated in section at FIG. 5 the fabrication per se includes an outer layer 14 comprising an open mesh-like cross-woven fabric, including warp and woof strands 16–18 respectively. The strands are preferably formed of nylon or Teflon filaments or the like, of suitable diameters; and are woven so as to provide the desired degree of mesh openness. The fabrication also includes a thin sheet or film-like air-impervious liner as indicated at 20 (FIGS. 3, 5) which is so disposed as to lie inside of the net-like fabric; being thereby supported to prevent escape of air-cushion pressure from interiorly of the skirt or trunk structure through the fabication material.

The liner portion 20 of the fabrication may compromise a sheet of any suitable plastic such as, for example, a sheet of Mylar of a thickness of the order of 10 mils, or a vinyl sheeting of a thickness of the order of 20 mils; although it will of course be understood that the liner portion of the fabrication may be formed of any other suitably flexible, lightweight and air-impervious material. The liner sheet 20 may be fastened or partially fastened at intervals to the supporting net lamination; or, may be left to lie freely thereagainst, as may be preferred.

For example, as shown at FIGS. 3–4, a laminate skirt structure of the invention may be attached to the rigid hull structure 22 by means of a simple clamp device designated generally at 24. As best shown in FIG. 4, the clamp device 24 may be formed from an extruded plastic stock piece to include a longitudinal recess 26 receiving therein the upper edge of the combination net and liner fabrication. The clamp 24 may be arranged to grip upon the fabrication by any suitable means, such as by preset resilient compressive forces, or through the use of adhesive, or machine screws, or heat-sealing techniques; as may be preferred. As shown in FIG. 4, the clamp 24 includes spaced recess portions 28 for accommodation of hinge leaf devices extending from the rigid hull structure; the hinge connections then being completed by slip-fitting hinge pin devices as indicated at 30 through the hinge leaves and apertures 32 formed in the clamp member. Thus, it will be seen that the clamp device 24 provides means for attaching the skirt structure to the rigid hull, while avoiding stress concentrations on the fabrication and permitting full freedom for billowing of the skirt material incidental to alternate inflation-deflation of the skirt structure and/or operational use of the machine.

It will be appreciated that skirt material fabrication of the present invention provides important advantages compared to previously conventional type skirt materials. For example, due to the extreme tensile strength capabilities of nylon and Teflon fibers, or the like, the web lamination 14 of the structure supplies the combination fabrication with an improved overall resistance to operational hazards, while at the same time contributing an improved degree of flexibility to the fabrication and thereby providing improved operational capabilities. Furthermore, inasmuch as the only operational requirement for the liner is that it provides a good air pressure barrier when backed up by the web lamination of the structure, the liner portion of the structure may be selected of any suitable lightweight flexible material without regard for any substantial strength characteristics.

It is to be understood that various modifications of the skirt structure as illustrated and described hereinabove and of its application to ground effect vehicles or the like, are contemplated. For example, in lieu of a single web and a single liner structure as shown in the drawing herewith, multiple layers of both or either thereof may be employed whenever indicated. To provide for attachments of pull devices or the like to various parts of the fabrication, the web structure at such points may be readily re-enforced either by gathering the web strands into more closely related positions at that point (and heat-sealing them thereat) or by the application of re-enforcing patches to such areas of the primary structure. To increase the wear resistance capabilities of the skirt material it may of course be armoured as by coating it with abrasion resistant material such as alumina silica or the like.

It is another feature of the invention that in order to fabricate a trunk or skirt of curbed shape, the web lamination may be initially pulled taut over a suitably shaped form, and then heat-treated so as to bond the web strands together, thereby holding the web in the intended curbed form. The web strands, being formed of thermosetting plastic material, are readily suited to such fabrication techniques. Also, the skirt pattern may be easily maintained by "binding" the material around its edges as by means of any suitable heat-sealing technique. Another important feature and advantage of the invention resides in the fact that repairs to damaged skirt material of this type may be readily made in the field simply by tieing in place of the ruptured net material any locally available cord or string devices, or by patching the area with a fish net or a tennis net fragment, or the like; and then lining the repaired area with any locally available sheet material such as a piece of cloth or plastic or paper, or the like.

As shown in FIG. 3 of the drawing herewith, the fabrication of the invention particularly lends itself to facilitating the construction of an air-inflated trunk type skirt system as shown in FIGS. 1, 3, wherein it is desired to provide a trunk structure embodying an air exit slot as indicated at 36, through which air continuously flows from interiorly of the trunk 10 to act as a high pressure fluid curtain circumscribing the machine support air cushion perimeter, and to also constantly replenish the cushion air supply. The utility of such a system is currently recognized in the ground effect machine art. Thus, as shown in FIG. 3, a pair of liner members 20—20 will be supplied to lie interiorly of the trunk structure against opposite side wall portions of the web member 14, while being depth-wise dimensioned so as to fall short of meeting one another at their bottom edges, so as to thereby provide an air exit slot formation 36 therebetween, while the web member 14 operates to maintain the desired sectional contour of the trunk structure.

It will of course be understood that whereas only a few forms of the invention have been illustrated and described in detail hereinabove, it will be understood that various changes may be made therein without departing from the spirit of the invention.

I claim:
1. In a ground effect machine or the like, an air cushion defining trunk structure adapted to be removably mounted as a unit on and depend from a rigid structural portion of said machine, said machine portion having an opening through which air may be directed downwardly into said trunk, said trunk comprising a flexible air permeable open mesh-like sheet member formed of high tensile strength strand material; at least one pair of liner members formed of flexible and relatively fragile air impervious sheet material; and a pair of attaching devices removably mounted on said machine portion on opposite sides of said opening, said mesh-like member being fixably carried along spaced marginal edges thereof one by each of said devices and depending therefrom so as to define the contour of said trunk, said pair of liner members being fixably carried along first marginal edges thereof one by each of said devices and depending therefrom interiorly of said mesh-like member, said liner members being dimensioned such that when lying flatwise against said mesh-like member second marginal edges spaced from said first marginal edges thereof are arranged in a spaced relationship so as to define an air exit gap through said trunk for air directed into said trunk through said opening, said trunk being characterized by the fact that it is extremely light-weight and flexible and yet resistant to operational hazards.

2. In a ground effect machine or the like as set forth in claim 1, wherein each said device is of generally U-shaped section having spaced leg portions, one of said marginal edges of said mesh-like member and the corresponding first marginal edge of one of said liner members being fixably carried intermediate said leg portions.

3. In a ground effect machine or the like as set forth in claim 2, wherein each said device is formed from an elongated piece of extruded plastic material.

4. In a ground effect machine or the like as set forth in claim 2, wherein each said device is hingedly secured to said machine portion.

References Cited
UNITED STATES PATENTS

| 3,243,004 | 3/1966 | Mackie | 180—124 |
| 3,244,248 | 4/1966 | Prickett | 180—127 |
| 3,347,329 | 10/1967 | Jones | 180—128 |
| 3,387,685 | 6/1968 | Fresh et al. | 180—127 X |
| 3,414,077 | 12/1968 | Earl | 180—128 |

FOREIGN PATENTS

| 1,028,045 | 5/1966 | Great Britain. |

A. HARRY LEVY, Primary Examiner

U.S. Cl. X.R.

180—128